United States Patent
Russell et al.

(10) Patent No.: US 6,896,134 B2
(45) Date of Patent: May 24, 2005

(54) ARMORED PERIPHERAL CASE

(75) Inventors: Paul G. Russell, Campbell, CA (US);
Christopher M. Bradley, Redwood City, CA (US); Michael L. Simmons, Menlo Park, CA (US); Benjamin Chu, Milpitas, CA (US); John Christopher Edwon, Palo Alto, CA (US); Daren W. Hebold, Mountain View, CA (US); Christophe Phillipe Guy Koch, Santa Cruz, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 227 days.

(21) Appl. No.: 10/155,657

(22) Filed: May 24, 2002

(65) Prior Publication Data

US 2003/0217940 A1 Nov. 27, 2003

(51) Int. Cl.$^7$ .................. B65D 85/00; B65D 85/30; B65D 25/54
(52) U.S. Cl. .................. 206/320; 206/523; 206/586; 206/774; 206/775
(58) Field of Search .................. 206/320, 477, 206/523, 586, 453, 592, 594, 769, 772–775; 190/111, 112, 900–902; 150/119; 312/223.2

(56) References Cited

U.S. PATENT DOCUMENTS

| | | | | |
|---|---|---|---|---|
| 4,643,281 A | * | 2/1987 | Erickson | .................. 190/119 |
| 4,790,417 A | * | 12/1988 | Tomikawa et al. | .................. 190/102 |
| 5,379,893 A | | 1/1995 | Ruiz | |
| 5,494,157 A | | 2/1996 | Golenz | |
| 5,570,780 A | * | 11/1996 | Miller | .................. 206/320 |
| 5,871,094 A | | 2/1999 | Leibowitz | |
| 6,109,434 A | * | 8/2000 | Howard, Jr. | .................. 206/320 |
| 6,116,418 A | | 9/2000 | Sadow | |
| 6,145,661 A | * | 11/2000 | Jung | .................. 206/320 |
| 6,179,122 B1 | * | 1/2001 | Moncrief et al. | .................. 206/320 |
| 6,223,896 B1 | | 5/2001 | Bell | |
| 6,273,310 B1 | | 8/2001 | Gregory | |
| 6,349,825 B1 | | 2/2002 | Swinger | |

* cited by examiner

Primary Examiner—Mickey Yu
Assistant Examiner—J. Gregory Pickett

(57) ABSTRACT

A protective carrying case for a computer includes a top portion and a bottom portion for supporting the computer. The top portion is configured to close over the computer and mate with the bottom portion to form a complete enclosure around the computer, with padding to protect the computer. The bottom portion advantageously provides a low peripheral profile, allowing access to peripheral ports disposed on the sides of the computer while the computer is disposed thereon. The case may also include enlarged cushioned corners for providing additional protection to the corners of the computer, and an openable back portion, configured to selectively expose the computer's external connector ports, to allow connection of the computer to external components while the computer remains substantially enclosed within the case.

6 Claims, 4 Drawing Sheets

ARMORED PERIPHERAL CASE

BACKGROUND OF THE INVENTION

1. Field of the Invention

The present invention relates generally to protective cases for transporting computers. More particularly, the present invention relates to a portable protective case for a laptop computer, which is configured to allow easy use of the device and to allow access to various peripheral ports on the sides of the computer.

2. Related Art

Portable electronic devices, such as laptop computers, cell phones, PDAs, and the like, are becoming more popular and affordable. However, in many respects these devices remain relatively fragile. While many manufacturing and design improvements have made them more robust, they remain susceptible to damage during transport. This is especially true of laptop computers, which generally include relatively large LCD screens and alphanumeric keyboards, and frequently also include CD ROM drives and other sensitive components. Given their typical size, shape, weight, and variety of internal components, laptop computers are especially susceptible to damage when being moved about.

There are a number of carrying cases that exist for laptop computers. The most common is a soft fabric case with a zipper closure. Such cases frequently include padding to protect the computer, and flexible strap-type handles for easy carrying. However, when a laptop computer is dropped or jostled, it is likely to encounter the greatest damage at corners and edges. Thus, a case with relatively constant thickness padding all around does not provide greater protection where such protection is needed. Furthermore, in many situations a soft fabric case is simply not adequate. For example, when transporting a laptop computer on an airplane, a much stronger carrying case is needed to protect the computer from damage, from baggage handling or from shifting loads, whether in a baggage hold or in a carry-on compartment. While hard-shell computer cases exist, they are frequently bulky and heavy.

Typical laptop computer cases do not allow the user to use the computer or attach it to peripheral devices while still in or attached to the case. The sides of these cases generally cover the peripheral device connectors, such as electrical power, data, and other ports, as well as CD drives, floppy disk drives, flash memory slots, and other peripheral ports normally found on the sides and back of the computer. Additionally, such cases also frequently surround the keyboard with structure that makes it difficult or uncomfortable to use the computer while still in the case. Consequently, to use the computer, a user must typically remove the computer from the case before using it. This can be difficult or inconvenient in many situations. For example, on an commercial airplane, space is at a premium, and there may be no convenient place to put the computer case while using the computer. Likewise, the required setup time to remove the computer in order to use it or connect it to a power source (even an external battery) or other peripheral device can discourage computer use during small windows of time that a user may have available here and there. This may tend to reduce worker productivity by wasting time that could otherwise be productively spent if the computer setup time were shorter.

SUMMARY OF THE INVENTION

It has been recognized that it would be advantageous to develop a computer carrying case that is lightweight and compact, yet provides greater protection to the computer, especially at high-risk points.

It would also be desirable to develop a computer case that allows easy and convenient use of the keyboard and access to the computer's peripheral ports while still contained in or connected to the case.

The invention advantageously provides a protective carrying case for a computer, comprising a top portion, and a bottom portion configured to directly support the computer. The top portion is configured to close over the computer and mate with the bottom portion to form a complete enclosure therearound. Padding is disposed within the bottom portion and top portion to protect the computer. The bottom portion has a low peripheral profile, allowing access to peripheral ports disposed on the sides of the computer while the computer is disposed thereon.

In accordance with a more detailed aspect of the present invention, the top portion and bottom portion are hingedly connected together in a clamshell-like configuration.

In accordance with another more detailed aspect of the present invention, the case includes an openable back portion, configured to expose the computer's external connector ports, to allow connection of the computer to external components while the computer remains substantially enclosed within the case.

In accordance with yet another more detailed aspect of the present invention, the bottom portion includes airflow passageways, configured to allow circulation of cooling air to the underside of the computer.

Additional features and advantages of the invention will be apparent from the detailed description which follows, taken in conjunction with the accompanying drawings, which together illustrate, by way of example, features of the invention.

DETAILED DESCRIPTION

Figure 1:
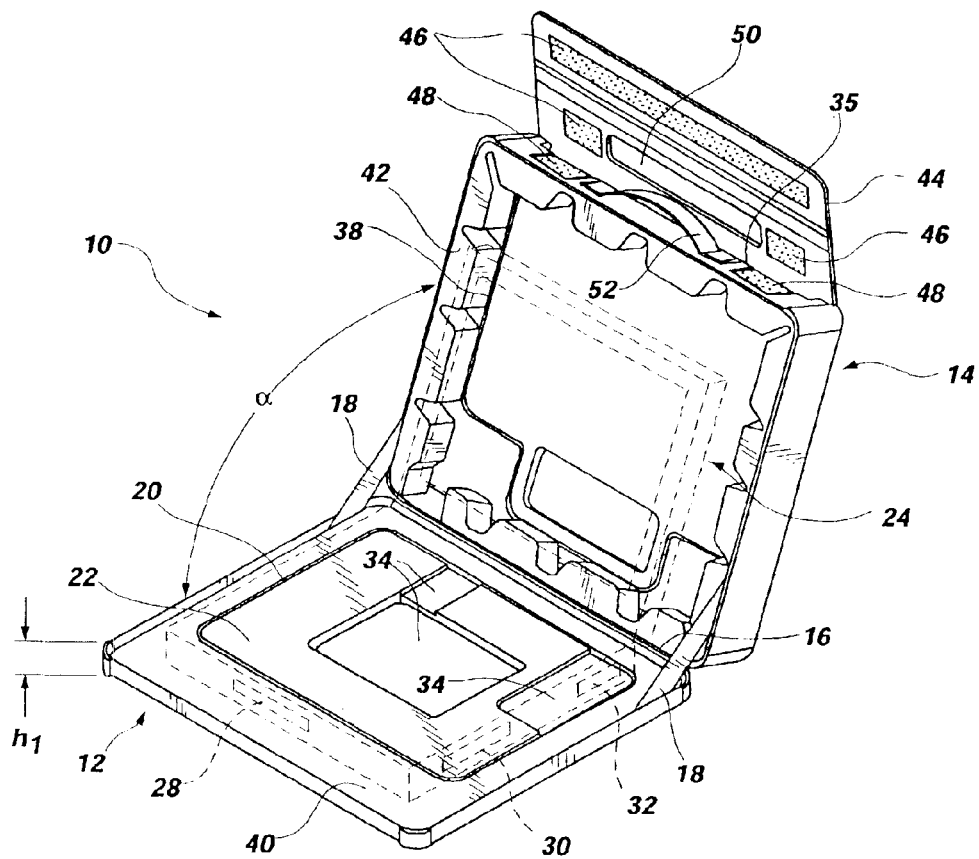
FIG. 1 is a perspective view of one embodiment of a computer case in accordance with the present invention, showing the case in the open position.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

One embodiment of a computer case in accordance with the present invention comprises a hard-shell case 10, shown in FIG. 1. The case generally comprises a bottom portion 12 and a top portion 14, connected together via a hinge 16 in a clamshell fashion. The top and bottom case portions are made of a polymer core, with a fabric skin bonded to both the inside and outside surfaces. The hard-shell case may be made of a variety of materials. In one embodiment, the polymer core is polyurethane, polypropylene, polyethylene or other similarly strong yet flexible and lightweight polymer material, and may be formed by compression-molding, thermo-forming, injection molding, or some other process. The fabric skin is a polymer cloth, such as polyester, nylon, Lycra or stretch fibers etc. In one embodiment, the polymer cloth is the same material as is used to make wetsuits.

In the embodiment depicted in the drawings, the hinge 16 is a "living hinge," that is, a relatively thin and flexible, integrally-formed elongate region of the polymer core material of the top and bottom case portions 14 and 12, which allows the two portions to bend relative to each other. Alternatively, the hinge 16 may be a conventional mechanical hinge comprising intermeshing hinge loops and a hinge pin (not shown). A pair of gussets 18, such as of nylon webbing, are connected between the top and bottom portions in the vicinity of the hinge 16 to stop rotation of the hinge at a desired angle a.

The bottom portion 12 includes a base support 20, comprising a raised section 22 for supporting a laptop computer 24, shown in dashed lines in FIG. 1. In the embodiment depicted in the drawings, the raised section is integrally formed with and of the same material as the bottom portion. As is typical with laptop computers, the computer includes various peripheral ports disposed on its sides. As used herein, the term "peripheral port" is used to refer to any structure disposed on the sides of the computer and requiring or allowing user access. This includes external connector ports, such as an electrical power connector (84 in FIG. 6), data connections (86 in FIG. 6), and other such ports usually disposed on the back of the computer, as well as CD drives 28, floppy disk drives 30, flash memory slots 32, and other peripheral ports frequently found on the front or lateral sides of the computer. The term "side" or "sides" when referring to the computer is thus intended to include the back of the computer (i.e. the edge below the hinge connection between the monitor and base), as well as the front and lateral sides of the computer.

Advantageously, the bottom portion 12 has a low peripheral profile, allowing access to the peripheral ports while the computer 24 is disposed on the base support 20. More specifically, the height $h_1$ of the edges of the bottom portion is very low, as illustrated in both FIG. 1 and FIG. 6, allowing the user to easily access the peripheral ports on all sides of the computer, and also allowing easy use of the computer keyboard while the computer is disposed on the base support.

In the embodiment shown in FIG. 1, the raised section 22 of the base support 20 includes airflow passageways 34, primarily in the form of channels, formed in the base support. These channels are configured to allow circulation of cooling air to vents on the underside of the computer 24, so as to prevent overheating. The computer is preferably removably attached to the base support, such as by mechanical fasteners (screws, tabs, Velcro, etc.), but it may also simply rest upon it.

Figure 2:
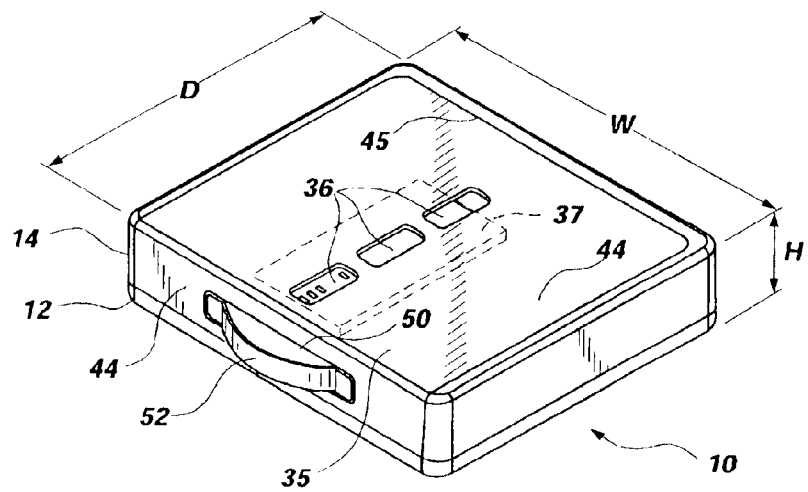
FIG. 2 is a perspective view of the case of FIG. 1 in the closed position.

The top portion 14 is configured to close snugly over the computer 24 and mate with the bottom portion 12 to form a complete enclosure around the computer, as shown in FIG. 2. Referring again to FIG. 1, the top and bottom portions include padding components, including a top pad 38, a bottom pad 40, and a perimeter pad 42. These pads are formed of resilient cushioning material, such as expanded foam of polyurethane, polypropylene, or other polyolefins, to help protect the computer from damage. The pads are formed in a size and shape to snugly fit the computer to prevent it from moving around within the case when it is closed. Additionally, the bottom pad 40 has a low profile (i.e. thickness) such that its top surface is generally flush with the top surface of the raised section 22, so as not to obstruct the peripheral ports of the computer 24.

Figure 3:
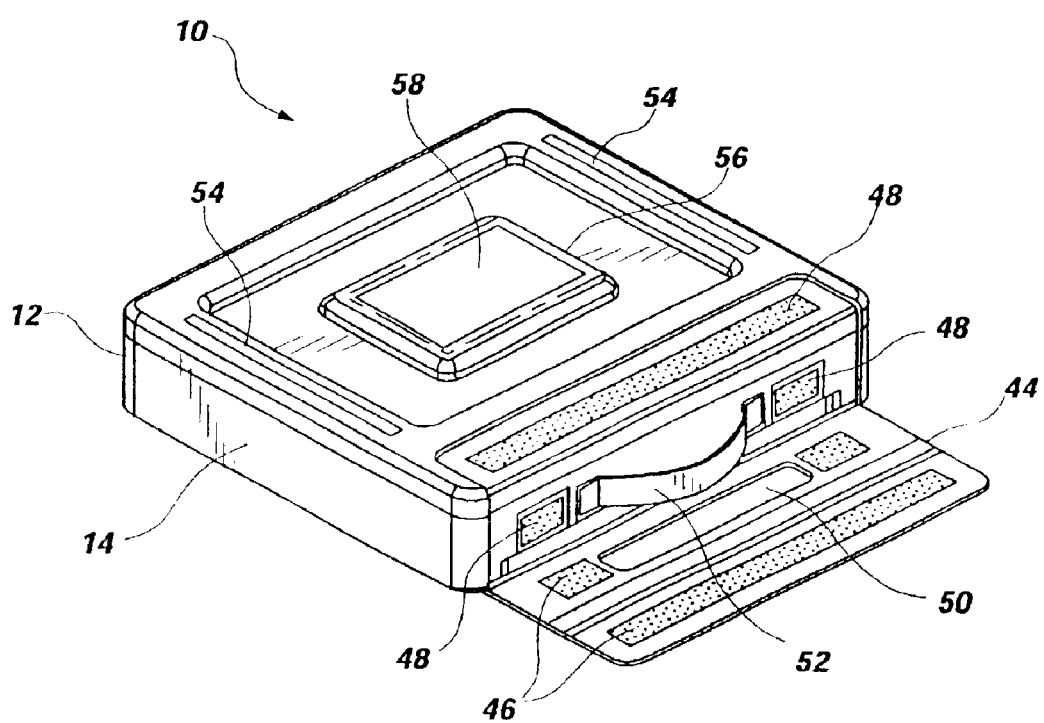
FIG. 3 is a perspective view of the case of FIG. 1 in the closed position, shown inverted from the orientation of FIG. 2.

Referring to FIG. 3, a closure flap 44 is connected to the top portion 14. The closure flap includes Velcro strips 46 that are configured to mate with corresponding Velcro strips 48 on the top portion and bottom portion 12. It also includes an opening 50 through which a carrying handle 52 protrudes. When the case 10 is closed, it can be easily grasped and carried by the carrying handle. In one embodiment of the case shown in FIGS. 1–3, when closed the total height H is about 3⅜", the total width W is about 13", and the total depth D is about 14¾". This size retains the compact size advantages that laptops provide, yet also gives greater protection for the computer when transporting it.

The closure flap 44 is a flexible yet durable piece of fabric. Viewing FIG. 2, the upper portion of the closure flap 44 is stitched at its edges 45 to the outside of the top portion 14 of the case 10. A thin space between the outside of the top portion 14 and the inside of the upper portion of the closure flap 44 forms a thin pocket 35, designed for storage of a thin profile (e.g. ¼" or ⅜" thick) computer battery 37. The upper portion of the closure flap also includes slots or windows 36 to allow viewing of the battery to visually verify its charge status (e.g. via LED indicator lights on the battery). It will be apparent that items other than a battery, such as papers, CDs, floppy disks, etc., may also be stored in the pocket.

Referring again to FIG. 3, the bottom portion 12 also includes support feet 54, configured to support the bottom portion on a support surface (not shown), such a table, desk, etc. These feet are preferably formed of a resilient, gripping rubber material, to help the case remain stable and secure on the support surface. A center platform 56 is also provided on the outside of the bottom portion, providing a location for a label, logo, or, as shown in FIG. 3, a pocket 58 for a business card or identification card.

Figure 4:
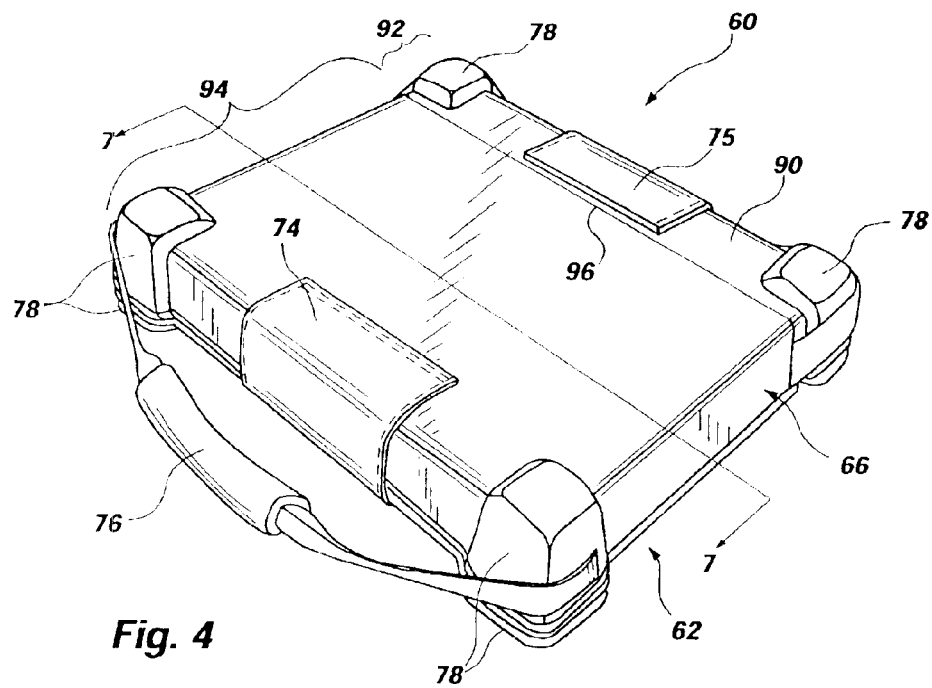
FIG. 4 is a perspective view of another embodiment of a computer case in accordance with the present invention, showing the case in the closed position.
Figure 5:
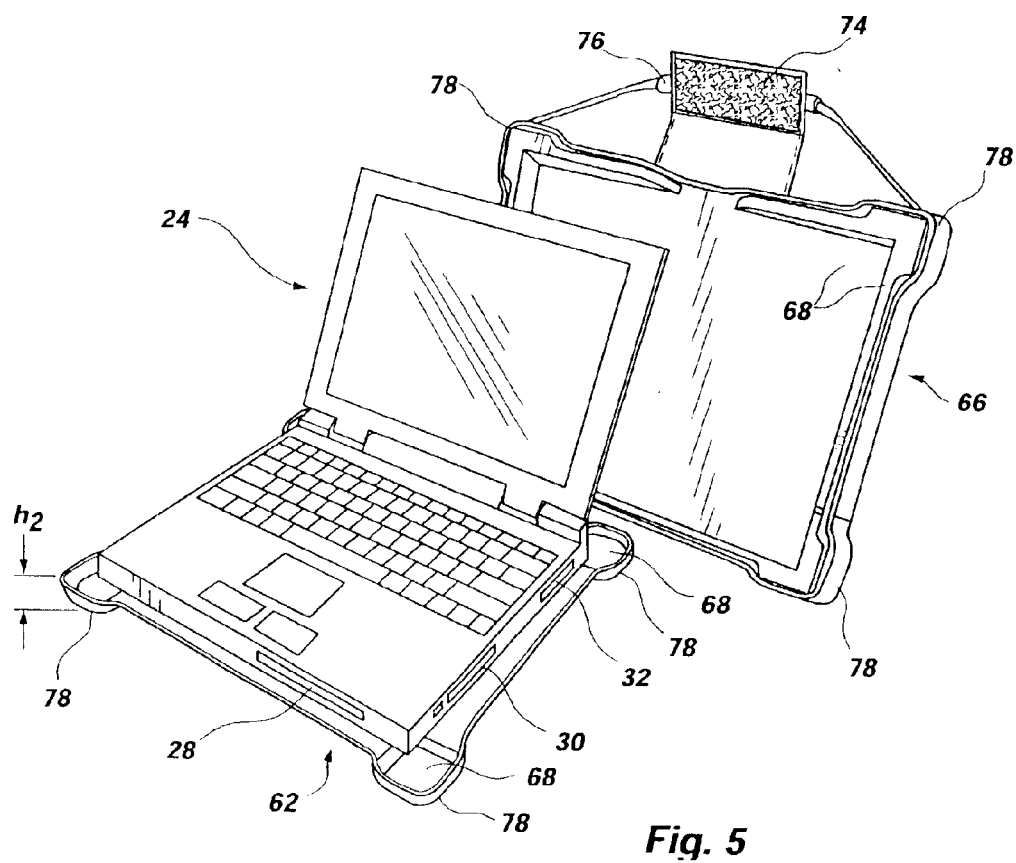
FIG. 5 is a perspective view of the case of FIG. 2 in the open position.
Figure 6:
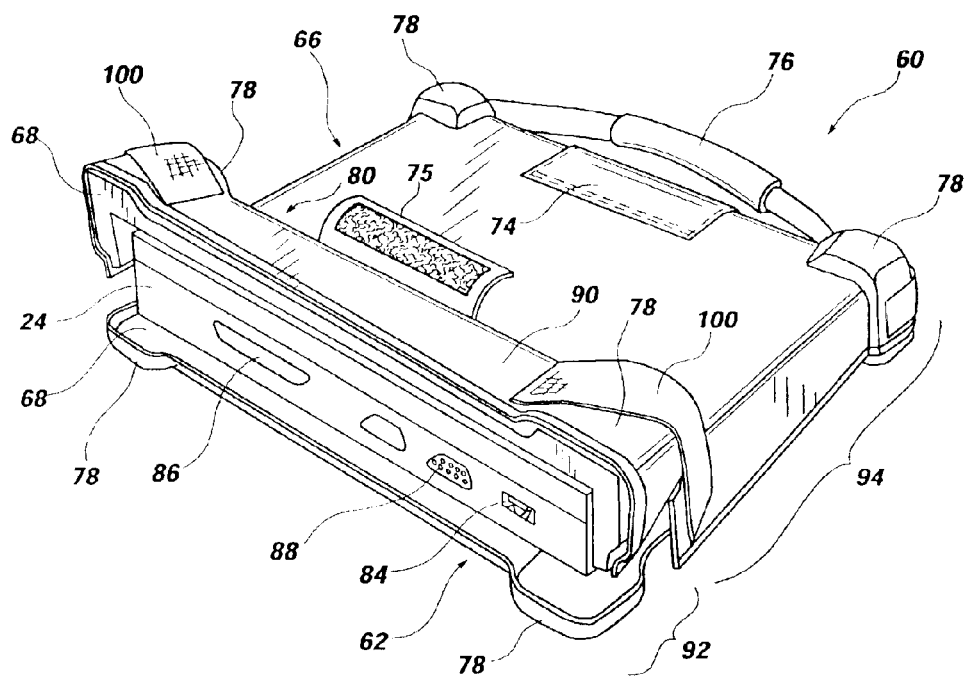
FIG. 6 is a rear perspective view of the case of FIG. 4, showing the connector port cover in the open position.
Figure 7:
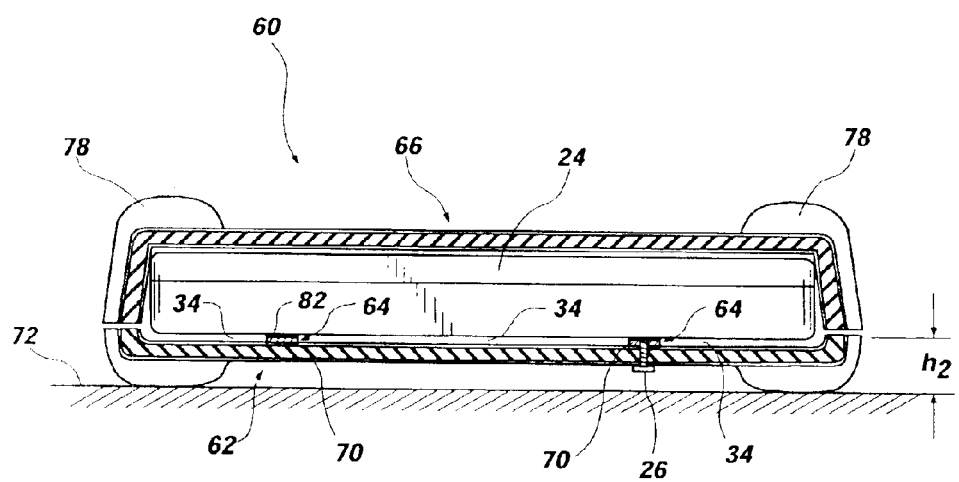
FIG. 7 is a cross-sectional view of the case of FIG. 4 taken along line 7—7

An alternative embodiment of a carrying case 60 is shown in FIGS. 4–7. Referring to FIGS. 4, 5, and 7, this case includes a bottom portion 62 with a base support 64 configured to support a computer 24, and a top portion 66 configured to close over the computer and mate with the bottom portion to form a complete enclosure around the computer. As with the embodiment of FIG. 1, the bottom portion has a low peripheral profile having height $h_2$, (FIG. 5) allowing easy access to the peripheral ports disposed on the sides of the computer while the computer is disposed on the bottom portion and the case is open. The case 60 also includes a front closure flap 74, a rear closure flap 75, and a carrying handle 76. The front and rear closure flaps include Velcro fasteners, and are designed to secure the top portion to the bottom portion when the case is closed.

As with the embodiment of FIGS. 1–3, the top and bottom portions 66 and 62 preferably comprise a compression-molded polymer core, with a polymer fabric skin bonded to the inside and outside surfaces. However, also as with the other embodiments, other materials and fabrication processes may be used to make a case that is strong and durable, yet flexible and lightweight. Padding components 68, e.g. of expanded polyurethane foam, are included within the top and bottom portions to protect the top, bottom, and sides of the computer 24. Like the padding components mentioned above for the hard-shell case embodiment, these padding components may be formed of expanded polyurethane foam or other suitable cushioning material. The padding components are shown in more detail in the cross-sectional view of FIG. 7.

It can also be seen in FIG. 7 that the base support 64 of this embodiment comprises a pair of support bars 70 which support the computer above the inside of the bottom portion 62, thus providing air circulation passageways 34 for cooling. As noted above and more particularly shown in FIG. 7, the computer 24 may be removably attached to the bottom portion of either of the embodiments illustrated herein by mechanical fasteners, such as screws or bolts 26, or by Velcro pads 82, or other fastening means, such as releasably interlocking tabs (not shown).

Unlike the embodiment of FIG. 1, the top portion 66 is not permanently connected to the bottom portion 62, but is configured to be taken completely off when the case is opened, as shown in FIG. 5. Additionally, the embodiment of FIGS. 4–7 includes enlarged cushioned corners 78 on the top portion and bottom portion. These enlarged corners include thicker portions of foam padding components 68, to help provide additional cushioning and protection for the corners of the computer 24. As shown in FIG. 7, the enlarged cushioned corners may also function as support feet for supporting the case 60 on a support surface 72.

Referring to FIG. 6, the top portion 66 of the case 60 includes a rear hatch or openable back portion 80, configured to be selectively openable when the case is otherwise closed, so as to expose the external connector ports at the back of the computer. As mentioned above, these external connector ports may include an electrical power connector 84, a data connection port 86, a CRT connection port 88, etc. This configuration of the case allows connection of the computer to external components (e.g. a power supply, a docking station, a CRT monitor, etc.) while the computer remains within the case. In the embodiment shown in the drawings, the openable back portion comprises a connector port cover 90, which basically comprises the rearward section 92 of the top portion 66. This rearward section is hingedly connected to the forward section 94 of the top portion by a hinge 96, such as a "living hinge" or flexible region of the top portion 66, and includes padding components 68 which protect the computer 24 when the connector port cover is closed. With this configuration, the connector port cover may be selectively adjusted between an open position, wherein the external connector ports are exposed (as depicted in FIG. 6), and a closed position, wherein the external connector ports are covered (as depicted generally in FIG. 4).

A retainer mechanism, comprising resilient straps 100, is connected between the forward and rearward sections, 94 and 92, respectively, of the top portion 66 on each side. This retainer mechanism normally operates to retain the connector port cover 90 in the closed position, which is generally desired for protecting the computer 24, and will necessarily be the position when the case 60 is closed via the rear closure flap 75. However, it also allows the connector port cover to be manually rotated to the open position when desired for connection to external components, and helps retain it in the open position as long as desired. When external connection is completed, the user simply removes the cords, cables and such from the external connector ports, and rotates the connector port cover 90 back to the closed position, and secures the rear closure flap if desired.

The invention thus provides a computer carrying case that is lightweight and compact, yet provides greater protection to the computer, especially at high-risk points, such as the corners. The case is formed of durable yet flexible polymer material that absorbs and dampens impact, and also includes other internal cushioning and padding for further protection. The invention also provides a computer case that allows easy and convenient use of the keyboard and access to the computer's peripheral ports while the computer is still contained in or connected to the case.

It is to be understood that the above-referenced arrangements are only illustrative of the application for the principles of the present invention. Numerous modifications and alternative arrangements can be devised without departing from the spirit and scope of the present invention while the present invention has been shown in the drawings and fully described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

What is claimed is:

1. A protective carrying case for a computer having external connector ports, comprising:
   a) a bottom portion, configured to support the computer, having enlarged cushioned corners and a low peripheral profile, allowing access to peripheral ports disposed on a side of the computer while the computer is disposed thereon, and including a channel, configured to allow circulation of cooling air to an underside of the computer;
   b) a top portion, having a forward section and a rearward section, having enlarged cushioned corners, and configured to close over the computer and mate with the bottom portion to form a complete enclosure therearound;
   c) padding components, disposed within the bottom portion and top portion;
   d) said top portion including a connector port cover, comprising the rearward section of the top portion, extending between and including the enlarged cushioned corners at the rearward section of the top portion, configured to raise to expose the external connector ports on a rear of the computer, to allow connection of the computer to external components while the computer remains substantially enclosed within the case; and
   e) a retainer mechanism, associated with the forward and rearward sections of the top portion, configured to retain the connector port cover in a raised position when opened.

2. A carrying case in accordance with claim 1, further comprising support feet, disposed on the bottom portion, configured to support the bottom portion on a support surface.

3. A carrying case in accordance with claim 1, wherein the enlarged cushioned corners on the bottom portion comprise support feet.

4. A carrying case in accordance with claim 1, wherein the connector port cover comprises a hinge, hingedly connecting the connector port cover to the forward section of the top portion, whereby the connector port cover may be selectively moved between an open position, wherein the external connector ports are exposed, and a closed position, wherein the external connector ports are covered.

5. A carrying case in accordance with claim 4, wherein the retainer mechanism is configured to selectively retain the connector port cover in a closed position.

6. A carrying case in accordance with claim 1, wherein the computer is removably attached to the bottom portion.

* * * * *